UNITED STATES PATENT OFFICE.

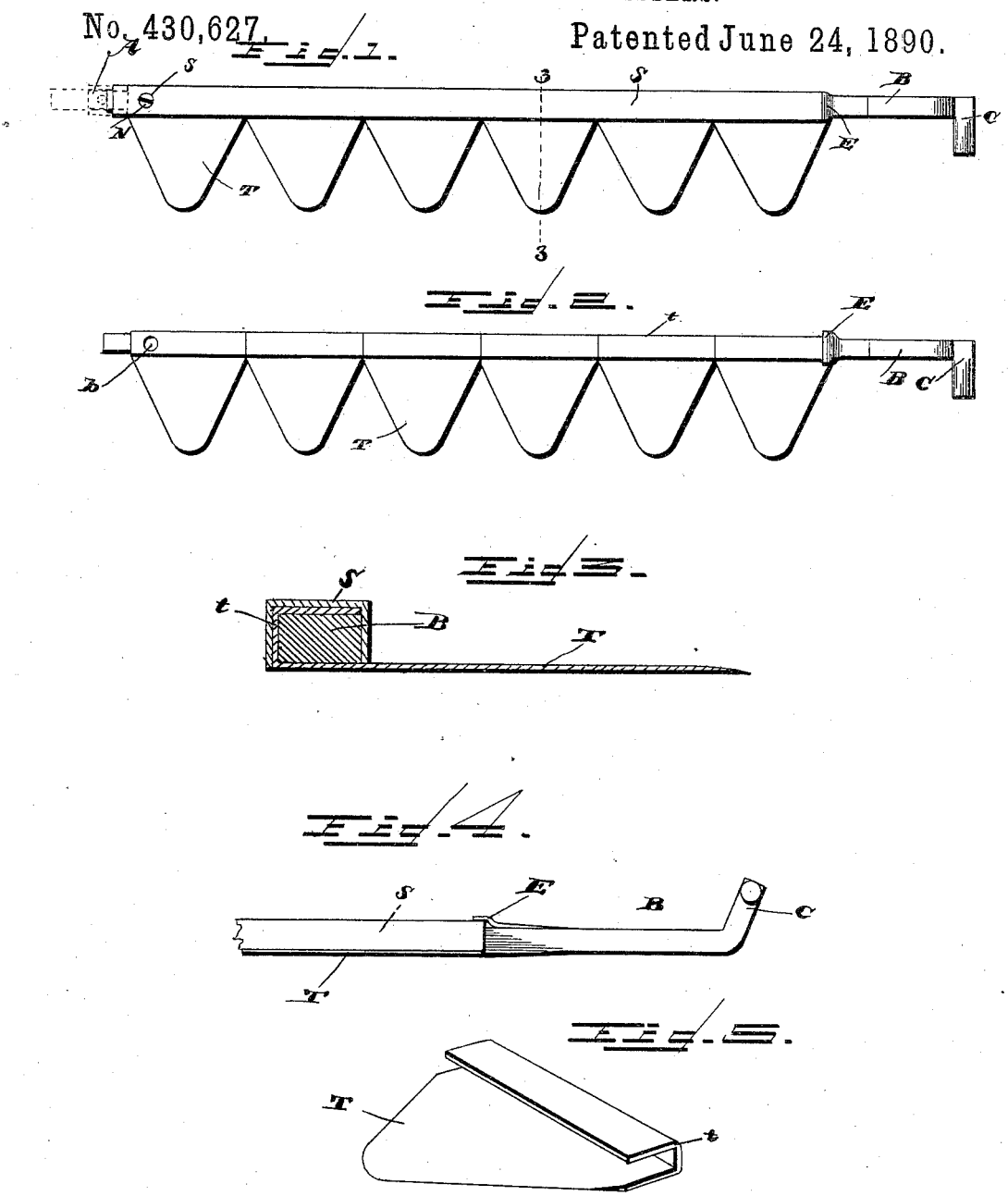

ROBERT C. DAVIS, OF COLUMBUS, OHIO, ASSIGNOR OF ONE-HALF TO RICHMOND R. BROWN, OF SAME PLACE.

CUTTER-BAR FOR HARVESTERS.

SPECIFICATION forming part of Letters Patent No. 430,627, dated June 24, 1890.

Application filed January 9, 1890. Serial No. 336,369. (No model.)

*To all whom it may concern:*

Be it known that I, ROBERT C. DAVIS, a citizen of the United States, residing at Columbus, in the county of Franklin and State of Ohio, have invented a new and useful Cutter-Bar for Harvesters, of which the following is a specification.

This invention relates to cutter-bars for harvesters; and it consists in a rectangular bar around and behind which elbows in the rear edge of the cutter-blades are adapted to be passed to hold the blades in proper position and a U-shaped shield or guard fitting under a lug at the inner end of the bar and screwed down into place at its outer end, the body of said shield holding the inner ends of the blades in clamped position upon the bar, all as will be hereinafter more fully described.

Heretofore cutter-bars have been provided upon which the blades were to be placed in substantially the same manner as in the present instance; but these blades were held in place by collars sliding upon and around the body of the bar, and engaging behind lateral ears on the edges of the blades to hold the latter in place. With this arrangement, when a tooth at some distance from the inner end of the bar became broken or damaged, the binding-screw which held all the teeth and collars from lateral displacement was unscrewed, and all the teeth and collars out to the one damaged had to be moved longitudinally of the bar, in order to disengage the ears thereof from behind the collars at each side of the blade. My present invention is an improvement on such device, as it does away with the necessity for longitudinal movement of the teeth upon the bar, which is often rendered very difficult by rust and irregularities in the bar, and provides a means of independent attachment for each tooth to the bar, whereby it can be removed therefrom without in the least displacing the remaining teeth.

The following specification describes and the accompanying drawings illustrate what I consider the best means of carrying out my invention.

In the said drawings, Figure 1 is a plan view of my improved cutter-bar. Fig. 2 is a similar view with the shield removed. Fig. 3 is an enlarged cross-section on the line 3 3 of Fig. 1. Fig. 4 is an elevation of the inner end of the bar, showing the manner of attaching the shield thereto. Fig. 5 is a perspective view of one of the teeth.

The letter B represents the cutter-bar of an ordinary harvester of any approved pattern, which bar, it will be understood, is longitudinally reciprocated by the mechanism of the harvester through the medium of the crank C at the inner end thereof. This bar is provided near its inner end with a shoulder E, rising from its upper face, and at its outer end with a screw-threaded hole $b$, for a purpose to appear later. The bar B is of rectangular cross-section preferably, although other forms will answer; but this is the form of section I prefer as giving the best results.

The letter T designates the teeth, of which there are any number desired, according to the length of the bar and the size of the teeth, and the latter are each provided with a shank $t$, bent upwardly at the rear end of the tooth and then forwardly, as clearly shown in Fig. 5, and as well understood in the art. By these shanks the teeth are adapted to be slipped onto the bar from its rear edge, and as the space within the shanks is exactly the size and shape of the bar the teeth are thereby firmly yet removably held thereon thereby.

The letter S represents a shield of approximate U shape, whose interior is of a size to closely fit over the shanks of the teeth and the front face of the bar when it is applied to the latter from above, as will be seen in Fig. 3. The shield S is provided near its outer end with a hole $s$, registering with the screw-threaded hole $b$ in the bar when the shield is in position.

In assembling the parts of my improved cutter-bar the teeth are first put in place by having their shanks slipped onto the bar from the rear, whereby their bodies will stand side by side and about in the relative positions shown in Figs. 1 and 2. The shield S is then inserted at its inner end under the shoulder E and its body pressed closely down over the shanks of the teeth, it being understood that the distance between the vertical faces of the shield is equal to the combined thickness of the cutter-bar from front to rear and the thickness of the vertical members of the shanks t of the teeth. A screw or bolt N is then passed through the registering holes s and b, whereby the outer or free end of the shield is locked in place and the parts are held in relative position until the screw N is again removed. When a tooth becomes broken or damaged, this screw is removed, the shield lifted, the broken tooth knocked out by a sharp blow upon its front end, and a new tooth inserted in its place, the whole operation occupying but a few moments' time and requiring no special knowledge of tools.

In Fig. 2 I have shown the screw N as passing through a hole in the outer tooth; but I prefer generally to employ a short strip of metal, as A, as shown in dotted lines in Fig. 1, through which this screw passes and which fits snugly against the outer edge of the end tooth. By the use of this strip it will not be necessary to cut the hole in the outer tooth for the passage of the screw, and if this tooth becomes broken or damaged an ordinary tooth can be substituted therefor.

I claim as the salient points of my invention—

1. The combination, with the rectangular bar, of the teeth having shanks fitting three sides of said bar, the shield fitting two sides of said shanks and the fourth side of the bar, and means, substantially as described, for retaining said shield in position, as set forth.

2. The combination, with the rectangular bar, of the teeth having shanks closely fitting the rear and upper faces of said bar, the shield fitting the front, rear, and upper faces of said bar and tooth-shanks, and connections, substantially as described, between the ends of the bar and shield for retaining said shield in position, as set forth.

3. The combination, with the rectangular bar, of the teeth having shanks closely fitting the rear and upper faces of said bar, the shield closely fitting over the shanks of said teeth and against the front face of said bar, and connections, substantially as described, between the ends of the bar and shield for retaining said shield in position, as set forth.

4. The rectangular bar B, having the shoulder E at its inner end, in combination with the teeth T, having upwardly and forwardly bent shanks, the shield S, having a groove along its lower face adapted to embrace said shanks and bar, the inner end of said shank being engaged beneath said shoulder, and the screw N, passing through the shield and bar near their outer ends, as and for the purpose set forth.

In testimony that I claim the foregoing as my own I have hereto affixed my signature in presence of two witnesses.

ROBERT C. DAVIS.

Witnesses:
L. E. PUTNAM,
HELEN S. PUTNAM.